(12) United States Patent
Costa et al.

(10) Patent No.: US 7,941,166 B2
(45) Date of Patent: May 10, 2011

(54) METHOD FOR SYNCHRONIZING A RADIO COMMUNICATION SYSTEM DIVIDED INTO RADIO CELLS

(75) Inventors: Elena Costa, München (DE); Dirk Galda, Haar-Gronsdorf (DE); Harald Haas, Bremen (DE); Niclas Meier, Hamburg (DE); Hermann Rohling, Wolfenbüttel (DE); Egon Schulz, München (DE)

(73) Assignee: Siemens Aktiengesellschaft, Munich (DE)

( * ) Notice: Subject to any disclaimer, the term of this patent is extended or adjusted under 35 U.S.C. 154(b) by 1107 days.

(21) Appl. No.: 10/563,941

(22) PCT Filed: Jun. 28, 2004

(86) PCT No.: PCT/EP2004/051272
§ 371 (c)(1),
(2), (4) Date: Jan. 10, 2006

(87) PCT Pub. No.: WO2005/006586
PCT Pub. Date: Jan. 20, 2005

(65) Prior Publication Data
US 2006/0198354 A1    Sep. 7, 2006

(30) Foreign Application Priority Data
Jul. 10, 2003    (DE) .................................. 103 31 311

(51) Int. Cl.
*H04B 15/00*    (2006.01)
(52) U.S. Cl. ........ 455/502; 455/501; 455/446; 455/447; 455/63.1; 455/67.13; 370/350; 370/503; 370/508; 370/336; 370/337

(58) Field of Classification Search .................. 370/350, 370/319, 324, 330, 336, 337, 347, 321, 503, 370/328, 332, 508, 509, 510, 511, 512, 520; 455/503, 510, 443, 447, 502, 63.1, 67.11, 455/67.13, 450, 451, 452.1, 452.2, 444, 446
See application file for complete search history.

(56) References Cited

U.S. PATENT DOCUMENTS 5,128,925 A    7/1992    Dornstetter et al.
5,257,398 A *  10/1993   Schaeffer .................. 455/452.2
(Continued)

FOREIGN PATENT DOCUMENTS
CN    1250583 A    4/2000
(Continued)

OTHER PUBLICATIONS

International Search Report for International Application No. PCT/EP/2004/051272; mailed Dec. 30, 2004.
(Continued)

*Primary Examiner* — Huy Phan
*Assistant Examiner* — Olumide T Ajibade-Akonai
(74) *Attorney, Agent, or Firm* — Staas & Halsey LLP

(57) ABSTRACT

Data is transmitted via time division multiple access methods and every radio cell includes one base station each for the radio coverage of a plurality of mobile stations assigned to the radio cell. The base station receives, in addition to mobile station signals of its own radio cell, mobile station signals of neighboring radio cells and determines, on the basis of the mobile station signals received, a time synchronization value and/or a frequency synchronization value to which the base station synchronizes itself.

12 Claims, 4 Drawing Sheets

U.S. PATENT DOCUMENTS

| | | | |
|---|---|---|---|
| 5,293,423 A | | 3/1994 | Dahlin et al. |
| 5,408,496 A | * | 4/1995 | Ritz et al. ........................ 375/132 |
| 5,448,753 A | * | 9/1995 | Ahl et al. ........................ 455/422.1 |
| 5,485,463 A | * | 1/1996 | Godoroja ........................ 370/333 |
| 5,787,346 A | * | 7/1998 | Iseyama ........................ 455/439 |
| 5,828,659 A | * | 10/1998 | Teder et al. ........................ 370/328 |
| 5,859,841 A | * | 1/1999 | Gitlits ........................ 370/335 |
| 6,014,376 A | | 1/2000 | Abreu et al. |
| 6,091,936 A | * | 7/2000 | Chennakeshu et al. ........ 455/63.3 |
| 6,185,429 B1 | | 2/2001 | Gehrke et al. |
| 6,188,903 B1 | * | 2/2001 | Gardner et al. ........................ 455/447 |
| 6,201,803 B1 | | 3/2001 | Munday et al. |
| 6,490,262 B1 | * | 12/2002 | Hogger ........................ 370/337 |
| 6,516,199 B1 | * | 2/2003 | Soderkvist et al. ........... 455/502 |
| 6,542,754 B1 | * | 4/2003 | Sayers et al. ........................ 455/502 |
| 6,546,026 B1 | * | 4/2003 | Goeddel ........................ 370/513 |
| 6,622,022 B1 | | 9/2003 | Du |
| 6,771,628 B1 | * | 8/2004 | Soderkvist et al. ........... 370/337 |
| 7,006,834 B2 | * | 2/2006 | Gaal et al. ........................ 455/456.1 |
| 7,110,781 B1 | | 9/2006 | Hulbert et al. |
| 7,447,236 B2 | | 11/2008 | Manohar |
| 2002/0105918 A1 | * | 8/2002 | Yamada et al. ........................ 370/294 |
| 2003/0026371 A1 | | 2/2003 | Laroia et al. |
| 2003/0147362 A1 | * | 8/2003 | Dick et al. ........................ 370/324 |
| 2003/0227962 A1 | | 12/2003 | Hintz-Madsen |
| 2005/0107039 A1 | * | 5/2005 | Lindoff et al. ........................ 455/63.1 |

FOREIGN PATENT DOCUMENTS

| | | |
|---|---|---|
| CN | 1270717 A | 10/2000 |
| DE | 199 11 480 A1 | 9/2000 |
| DE | 199 11 480 C2 | 9/2000 |
| EP | 0 732 817 A2 | 9/1996 |
| EP | 0 954 122 A1 | 11/1999 |
| WO | WO 97/12489 | 4/1997 |
| WO | 98/31154 | 7/1998 |
| WO | 99/16183 | 4/1999 |
| WO | WO 01/20818 A1 | 3/2001 |
| WO | 2005/006586 A2 | 1/2005 |

OTHER PUBLICATIONS

Office Action issued Dec. 10, 2009 in U.S. Appl. No. 12/458,668.
U.S. Appl. No. 12/458,668, filed Jul. 20, 2009, Elena Costa, Siemens Aktiengesellschaft.
Office Action for co-pending U.S. Appl. No. 12/458,668; mailed Jul. 15, 2010.
Notice of Allowance of U.S. Appl. No. 12/458,668; mailed Jan. 28, 2011.

* cited by examiner

METHOD FOR SYNCHRONIZING A RADIO COMMUNICATION SYSTEM DIVIDED INTO RADIO CELLS

CROSS REFERENCE TO RELATED APPLICATIONS

This application is based on and hereby claims priority to German Application No. 103 31 311.7 filed on Jul. 10, 2003, the contents of which are hereby incorporated by reference.

BACKGROUND OF THE INVENTION

Cellular radio communication systems, in particular mobile radio systems, are divided into synchronized and non-synchronized radio communication systems.

In the former, base stations of adjacent radio cells are mutually synchronized in terms of time and/or frequency. For synchronizing, in particular for time synchronizing, GPS receivers are employed for instance on the part of the base stations, or base stations are synchronized with each other by synchronizing signals requiring to be exchanged at high cost. Since, moreover, radio transmission resources are occupied during the transmission of synchronizing signals, the resources will no longer be available for transmitting chargeable useful subscriber data (payload).

In non-synchronized radio communication systems, base stations of adjacent radio cells are not synchronized with each other.

As a representative instance of a mobile radio system, FIG. 3 shows a cellular radio communication system according to the related art.

Three adjacent radio cells FZ1 to FZ3 each have an assigned base station BTS01 to BTS03. Each of the base stations BTS01 to BTS03 provisions a number of the mobile stations T01 to T012 assigned to the respective radio cell FZ1 to FZ3, with a total of four carrier frequencies f9 to f12 being assigned by a "frequency reuse" planning method to a first base station BTS01 of a first radio cell FZ1, a total of four carrier frequencies f1 to f4 being assigned thereby to a second base station BTS02 of a second radio cell FZ2, and a total of four carrier frequencies f5 to f8 being assigned thereby to a third base station BTS03 of a third radio cell FZ3 exclusively for data transmission.

In a connection direction referred to as the "downlink" DL from the base station to the mobile station, each of the carrier frequencies f1 to f12 has seven timeslots TS1 to TS7 as radio transmission resources, while in a connection direction referred to as the "uplink" UL from the mobile station to the base station each of the carrier frequencies f1 to f12 has five timeslots TS1 to TS5 as radio transmission resources. Free, unused timeslots are shown by way of example for the carrier frequencies f2, f7, and f11 and designated by the letter "F".

The use of what are termed "orthogonal frequency division multiplexing" ("OFDM" for short) transmission technologies is gaining increasing significance in particular for mobile radio networks of cellular design because new services such as, for instance, transmitting video at fast data rates can be transmitted cost-efficiently with the aid of the technologies.

In radio communication systems, in particular in an OFDM radio communication system, the necessary multiple use of carrier frequencies in adjacent radio cells gives rise to what is termed "co-channel interference", which can be reduced with the aid of what is termed a "frequency reuse" planning method.

FIG. 4 shows, referred to FIG. 3, a synchronizing situation of the radio cells FZ1 to FZ3 that corresponds to the related art.

It is assumed below that the system is a time-synchronized radio communication system whose adjacent radio cells FZ1 to FZ3 have a "frequency reuse" factor of one, which is to say the radio cells FZ1 to FZ3 employ the same carrier frequencies.

Each base station BTS01 to BTS03 and the mobile stations T01 to T012 assigned to each base station BTS01 to BTS03 have in each case a base-station-specific carrier frequency deviation Delta01 to Delta03 which deviates from a predefined value MIT and is plotted vertically. The carrier frequency deviation Delta01 to Delta03 is due in each of the individual base stations BTS01 to BTS03 to electrical components of the respective base station, for example to base-station-specific local oscillators.

In particular when OFDM radio transmission technologies are used in a synchronous radio communication system, the fast data rates employed necessitate extremely accurate synchronizing which, however, can only be implemented at very high cost.

SUMMARY OF THE INVENTION

An object of the present invention is to disclose a low-cost synchronizing method for a cellular radio transmission system, in particular for an OFDM radio communication system.

A method according to the invention enables synchronizing in terms of time and/or frequency to be implemented in a cellular radio communication system by simple means.

The synchronizing especially advantageously enables in particular adjacent base stations to employ radio transmission resources from a stock that is commonly assigned to the base stations for data transmission. Particularly efficient radio resource management is facilitated thereby. Dynamic use of available radio transmission resources in the individual radio cells is introduced or, as the case may be, realized.

Available radio transmission resources are in each case optimally assigned in keeping with the momentary traffic load, with unevenly distributed subscriber occupancies being particularly advantageously evened out.

Radio transmission resources are in a preferred embodiment allocated taking account of an interference situation in a radio transmission resource requiring to be selected. This will enable, for example, two adjacent base stations each individually radio provisioning a mobile station assigned to it simultaneously to employ a timeslot of a carrier frequency as the radio transmission resource for radio provisioning the mobile stations, provided the interference situation in the selected timeslot will allow this.

Synchronizing will facilitate the application on the part of the base station and/or mobile station of interference suppression methods that are optimized in particular for mutually synchronous payload and interference signals.

The inventive method for synchronizing dispenses with transmitting additional signaling information for synchronizing that has hitherto had to be exchanged between the base station and mobile station in a higher protocol layer. Synchronizing according to the invention is in each case implemented automatically and solely through signal processing and subsequent adjusting of a synchronizing condition of the base stations or, as the case may be, mobile stations, which operations are performed on the receive side.

With the aid of the method according to the invention it is possible in the case of, say, large organized events in a simple manner to add further base stations at a later time, or, as the case may be, undertake a change associated therewith in the number of radio cells. By evaluating signals of already active mobile stations, a base station added later will synchronize itself with base stations already in operation. The added base station will dynamically select radio transmission resources needed for operation in such a way that co-channel interference on adjacent radio cells or, as the case may be, the mobile stations assigned to the radio cells will in each case be minimized.

A method according to the invention is used particularly advantageously in an OFDM radio communication system employed especially preferably for services having fast data rates.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
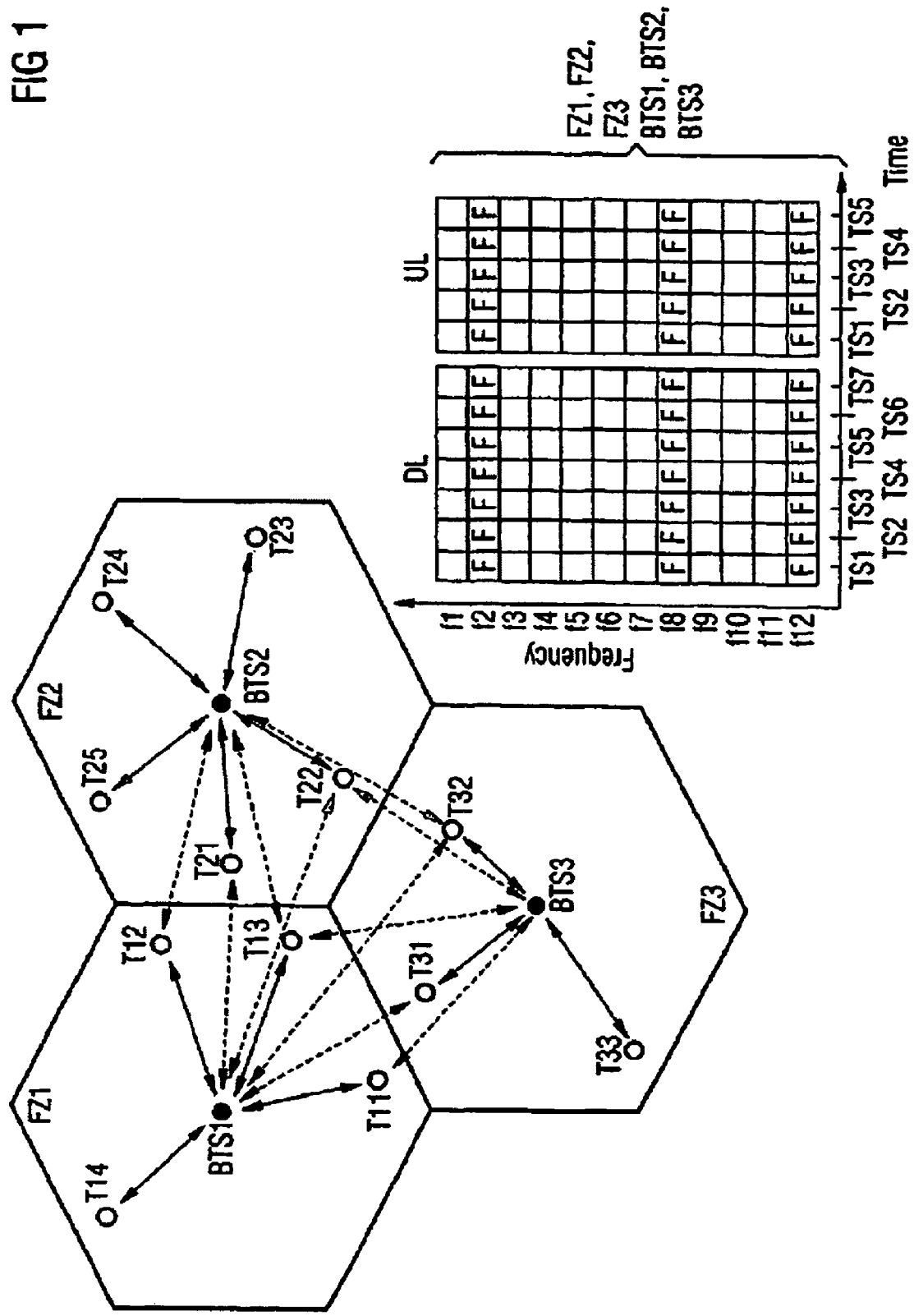
FIG. 1 is block diagram of an OFDM radio communication system having synchronizing according to the invention.

Reference will now be made in detail to the preferred embodiments of the present invention, examples of which are illustrated in the accompanying drawings, wherein like reference numerals refer to like elements throughout.

As a representative instance of a mobile radio system, FIG. 1 shows an OFDM radio communication system having synchronizing according to the invention.

Three adjacent radio cells FZ1 to FZ3 each have an assigned base station BTS1 to BTS3. Each of the base stations BTS1 to BTS3 individually provisions a number of mobile stations T11 to T33 assigned to the respective radio cell FZ1 to FZ3, with a total of four mobile stations T11 to T14 being assigned to a first base station BTS1 for radio provisioning while a total of five mobile stations T21 to T25 are allocated to a second base station BTS2 for radio provisioning. A total of three mobile stations T31 to T33 are allocated to a third base station BTS3 for radio provisioning.

For transmitting subscriber data, all three base stations BTS1 to BTS3 employ radio transmission resources that are commonly assigned on equal terms and are established by a total of twelve carrier frequencies f1 to f12. Each of the carrier frequencies f1 to f12 has in a connection direction referred to as the "downlink" DL from the base station to the mobile station seven timeslots TS1 to TS7 as radio transmission resources, while each of the carrier frequencies f1 to f12 has in a connection direction referred to as the "uplink" UL from the mobile station to the base station five timeslots TS1 to TS5 as radio transmission resources. Free, unused timeslots, shown by way of example for the carrier frequencies f2, f8, and f12 are designated by the letter "F".

Figure 3:
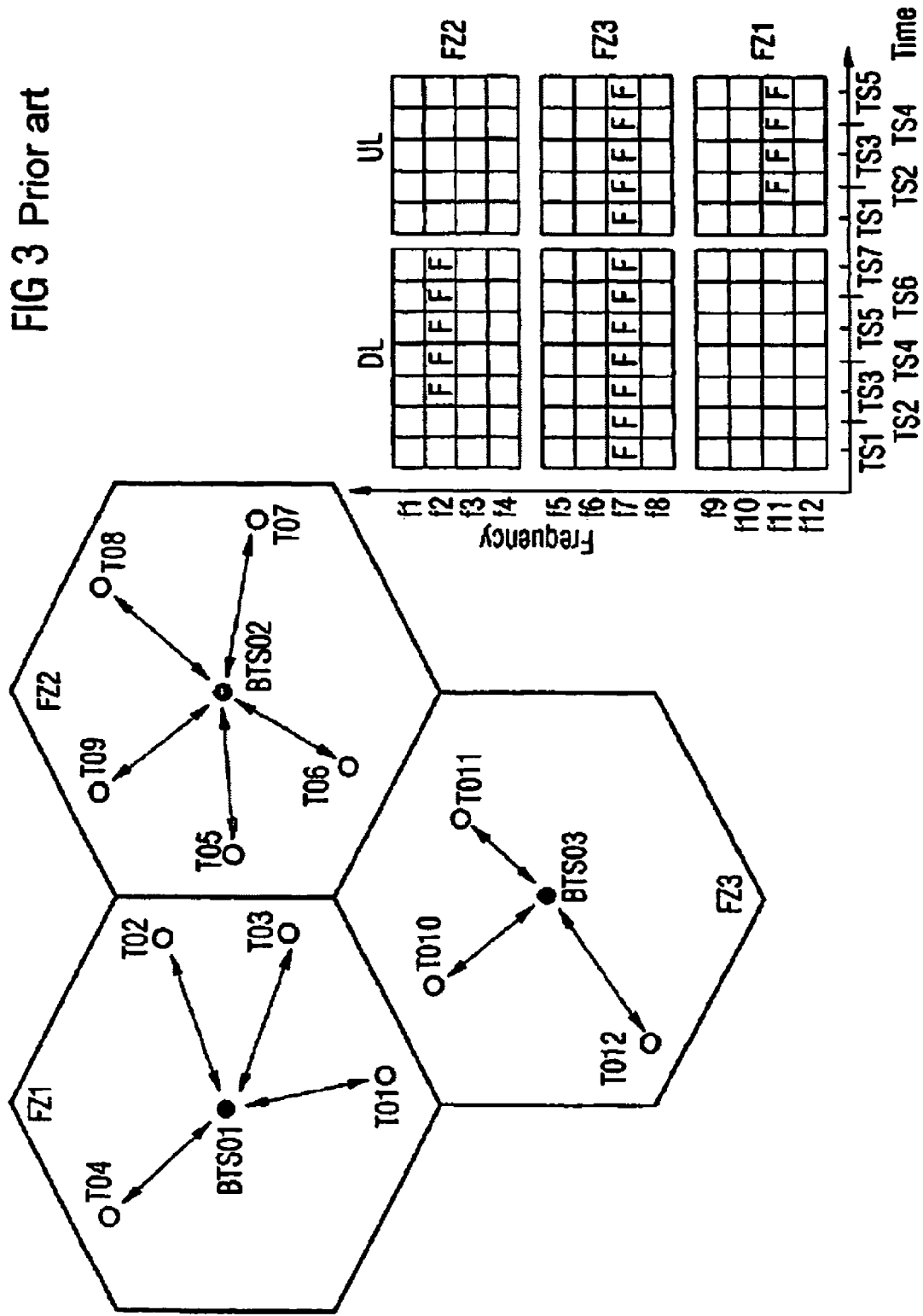
FIG. 3 is block diagram of the cellular radio communication system according to the related art described as a representative instance in the introduction to the description.
Figure 4:
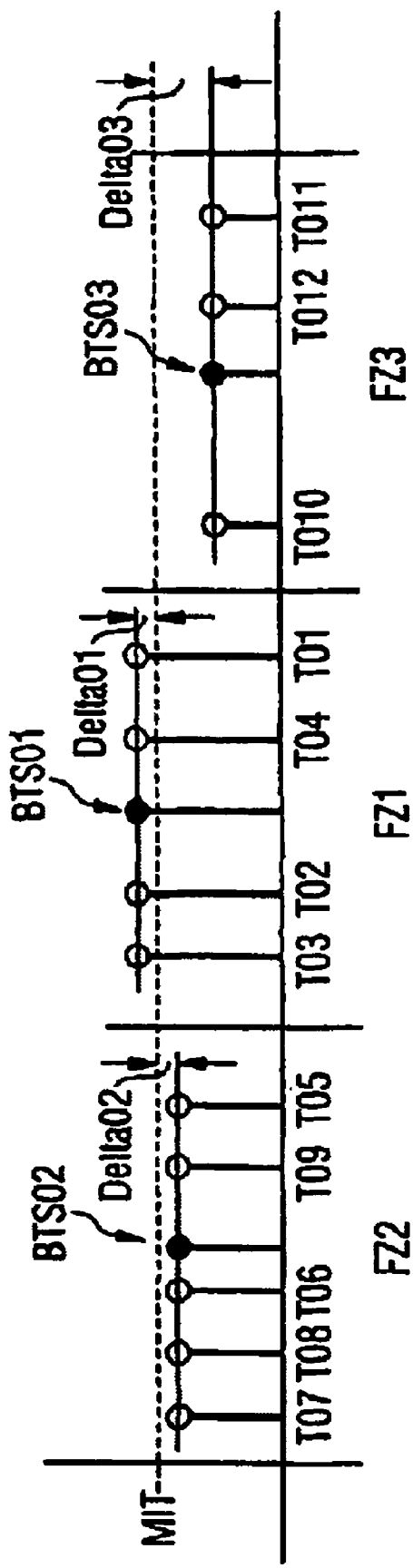
FIG. 4 is a diagram representing the synchronizing situation described in the introduction to the description and corresponding to the related art.

Compared with FIG. 3, through synchronizing according to the invention the exclusive allocation of carrier frequencies f1 to f12 to base stations or, as the case may be, radio cells has here been rescinded.

Synchronizing according to the invention is explained in more detail below with the aid of the first radio cell FZ1 as a representative instance of the second and third radio cell FZ2 and FZ3, with the term "synchronizing" here to be understood as both time synchronizing of the timeslots of the carrier frequencies and frequency synchronizing of the carrier frequencies.

Alongside signals of the mobile stations T11 to T14 assigned to it, the first base station BTS1 of the first radio cell FZ1 also receives signals from mobile stations of the adjacent radio cells FZ2 and FZ3 on the uplink UL. The receiving takes place automatically with no additional monitoring of other frequency bands.

For example, the first base station BTS1 also receives signals of the mobile stations T21 and T22 of the second radio cell FZ2 and signals of the mobile stations T31 and T32 of the third radio cell FZ3 on the uplink. The first base station BTS1 determines a first time deviation and a first frequency deviation based on the received mobile station signals of the adjacent radio cells FZ2 and FZ3 and from these values derives a suitable time-synchronizing value and a frequency-synchronizing value with which the first base station BTS1 finally synchronizes itself.

Viewed as representative of all the mobile stations, alongside signals of the base station BTS1 of its own radio cell FZ1 a third mobile station T13 of the first radio cell FZ1 also receives signals of the adjacent base stations BTS2 and BTS3 of the radio cells FZ2 and FZ3 on a downlink DL. The third mobile station T13 then determines a second time deviation and a second frequency deviation based on the received base station signals and from these values derives a suitable time-synchronizing value and a frequency-synchronizing value with which the mobile station T13 finally synchronizes itself.

The synchronizing according to the invention is repeated, for example, frame-by-frame, which, time-averaged, will produce precise, self-organizing time and frequency synchronizing.

Through synchronizing according to the invention, interference suppression methods are now employed in an advantageous embodiment thereof on the part of the base stations and/or mobile stations.

Through synchronizing according to the invention, particularly flexibly and adaptively implemented radio resource management is especially advantageously realized since all the base stations are able to access a common stock of radio transmission resources, with, for example, carrier frequencies being selected taking account of minimal co-channel interference. Transmission resources are allocated to mobile stations exclusively by the base station respectively assigned to the respective mobile station.

The rescinded exclusive allocating of carrier frequencies to base stations or, as the case may be, radio cells enables, for example, the base station BTS1 and the base station BTS3 to simultaneously use the timeslot TS5 of the carrier frequency f5 for radio provisioning respectively the mobile station T14 and the mobile station T32 if the interference situation in the timeslot TS5 will allow this. The interference situation is influenced by, for example, sectorized receiving and/or transmitting antennas on the base stations or by propagation characteristics of the radio signals or by the spatial distance between the subscribers, etc.

With sectorizing, a base station for transmitting and/or receiving radio signals has, for example, three antenna arrangements each of which individually radio provisions a sector with a beam angle of 120°. A spatial separation or, as the case may be, differentiation between radio signals is achieved thereby and, depending on the choice of the sector's beam angle, an improvement in an interference situation accomplished.

In the event of inhomogeneous radio cell utilization, each of the three base stations can, if required, access transmission resources of the carrier frequencies either entirely or only partially, as a result of which bottlenecks in the individual radio cells are avoided when there is simultaneously prevailing overcapacity in individual radio cells.

Newly added base stations synchronize themselves in respectively relevant frequency bands and evaluate the received signals accordingly for the purpose of time synchronizing and carrier frequency synchronizing. A subsequent expansion of the radio communication system or, as the case may be, subsequent capacity increase can thus be implemented at not very great cost.

Synchronizing according to the invention takes place automatically and requires neither expensive signaling nor expensive GPS synchronizing.

Figure 2:
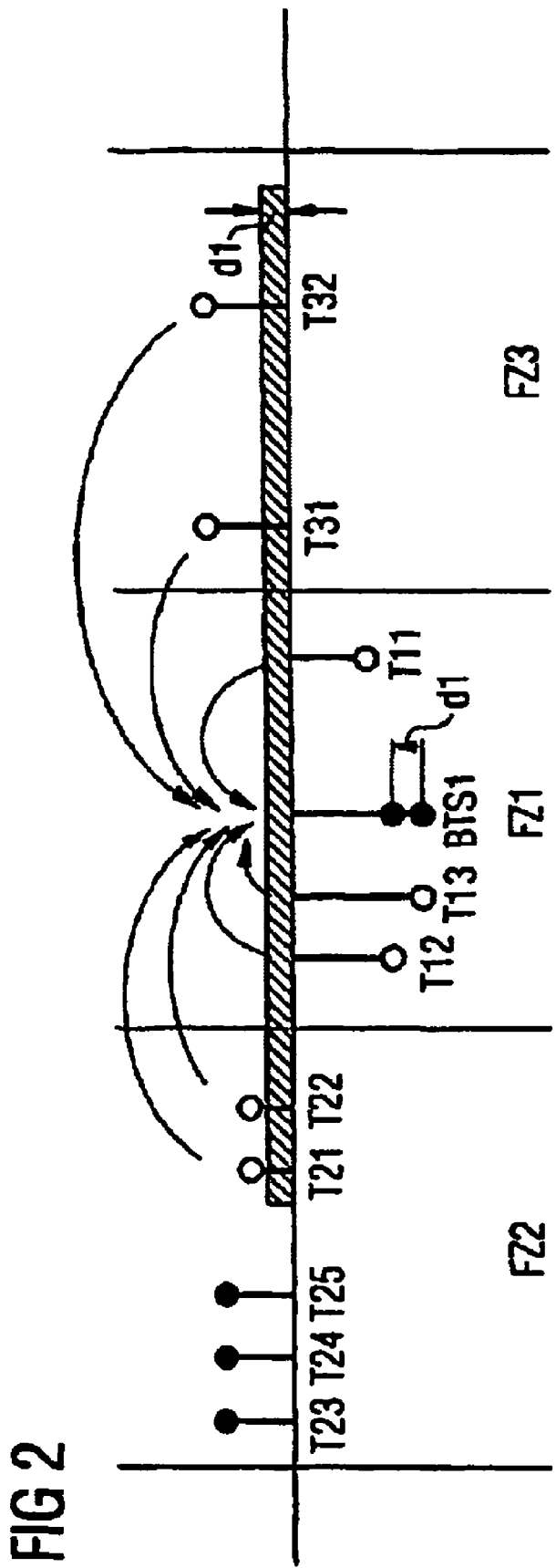
FIG. 2 is a diagram representing inventive synchronizing performed on the part of a base station shown in FIG. 1.

FIG. 2 shows, referred to FIG. 1, synchronizing performed on the part of the base station BTS1.

A mobile-station-specific carrier frequency deviation is plotted vertically for each individual mobile station. The first base station BTS1 under consideration receives on the uplink UL signals sent by the mobile stations T21, T22, T12, T13, T11, T31, and T32 and from the signals determines a synchronizing value d1, represented here by way of example as a mean value by a hatched rectangle. The base station BTS1 corrects its synchronizing accordingly in the direction of the positive synchronizing value d1. The same applies analogously to the further base stations BTS2 and BTS3.

While not described here in further detail, synchronizing of the respective mobile stations takes place in a manner comparable to the above.

If a TDMA/FDMA multiple access method is employed in the above-mentioned cellular radio communication network, either one on its own or both in combination, and if what is termed a time-division duplex (TDD) mode is considered for transmission, then a signal r(t) received at the base station will consist of an overlaying of a plurality of signals of all the radio cells' mobile stations transmitting simultaneously employing the FDMA multiple access method.

From the received signal r(t), each base station determines the mean receive instant of overlaid OFDM symbols of the mobile stations located in the adjacent radio cells.

With the aid of correlating adjacent sampled values arranged having an OFDM symbol length N spacing, the result for a sampled value k is a metric $\lambda(k)$ whose values also have periodic values in the case of an FDMA uplink having the OFDM symbol length N. The following applies:

$$\lambda(k) = \Sigma_{m=0}^{M-1} r(k+m) r^*(k+m+N)$$

where M stands for a window length across which metric values are averaged for noise reduction purposes. The length is as a rule identical to that of what is termed a "guard interval". A different length of a spacing N is in certain circumstances chosen from correlated values and the window length M for improving detection properties.

At the position of the mean time deviation of the signal components of the mobile stations at a respective base station, the absolute value of the metric $|\lambda(k)|$ assumes a value that is proportional to the total power of the signals of the mobile stations received from this cell. For this reason the maximum absolute value of the metric $|\lambda(k)|$ is sought after the metric values have been calculated and the position of the maximum absolute value continues being used a an estimation for the respective base station's time offset. The metric values will be complex if a residual carrier frequency deviation remains, which is why an approximation of the mean carrier frequency deviation of the signals received in the OFDM symbol can be determined from the phase measured in the metric maximum for small values of the carrier frequency deviation.

To separate the FDMA signals of different mobile stations, the received signal is advantageously evaluated in the frequency range as these are assigned to different subcarriers. The respective carrier frequency deviation will in this case arise from a phase rotation in the OFDM symbols received on each subcarrier.

The frequency deviation of a partial carrier frequency $\delta f(k)$ is herein the result of the phase change in the transmission factors $H(n,k)$ of a partial carrier frequency k between two consecutive OFDM symbols having a time index n and n+1 with a temporal spacing $T_s$. The following thus applies:

$$\delta f(k) = \frac{1}{2\pi} \angle \left\{ \frac{H(n+1,k)}{H(n,k)} \right\} \frac{1}{T_s}$$

From the values of the adjacent radio cells' carrier frequency deviation that are obtained after estimating in the frequency range, a for example mean carrier frequency deviation of the mobile stations received from the adjacent radio cells is determined following an evaluation in accordance with the quality of the estimation.

The respective time deviation will be determined from the phase rotation between the subcarriers of a received OFDM symbol by a mobile station assigned to the same base station. From the values of the time deviation that are obtained after estimating in the frequency range, a for example mean time deviation of the mobile stations received from the adjacent radio cells is determined following an evaluation in accordance with the quality of the estimation.

Each base station will, with the aid of the determined time deviation and carrier frequency deviation, adjust its respective own carrier frequency and own transmitting instant in keeping with the determined values. Given a suitably designed control loop filter, this operation will automatically result in a convergent estimation.

Inventive synchronizing of a newly added base station in a TDD radio communication system requires the following:
- uplink and downlink monitoring to determine a TDD frame structure,
- determining the absolute transmitting instant of all measured receiving instants, and
- evaluating the signals according to the above-cited scheme.

In each uplink phase, each base station determines useful components of the mobile stations active in the radio cell and the co-channel interference components originating from the adjacent radio cells for each subcarrier.

Based on this information, each base station makes an independent decision about a bandwidth to be occupied. The subcarriers having a minimum interference component are selected, with the base station making an adaptive decision, as a function of an achievable channel quality, about the position and number of subcarriers to be occupied and of the physical transmission parameters to be used to be able to optimally provision the mobile stations located within the radio cell. Organization across different cells is not required.

This type of multiple access avoids interference within a radio cell and between mobile stations of adjacent radio cells.

Self-organizing optimizing of a multiple access method employed is performed across different radio cells. This is done taking account of the radio transmission channel properties and of the momentary interference situation in a cellular environment.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for synchronizing a radio communication system divided into radio cells transmitting data by multiple access methods, each radio cell having a base station for radio provisioning mobile stations assigned to the radio cell, comprising:
   receiving at the base station of a radio cell, mobile station signals of the radio cell and adjacent radio cells;
   determining, from the mobile station signals received at the base station, a first synchronizing value for at least one of time synchronizing and frequency synchronizing to which the base station synchronizes itself;
   receiving at the mobile station of the radio cell, base station signals of the radio cell and adjacent radio cells;
   determining, from the base station signals received at the mobile station, a second synchronizing value for at least one of time synchronizing and frequency synchronizing;
   employing timeslots of commonly assigned carrier frequencies as radio transmission resources, wherein at least two adjacent base stations simultaneously and jointly employ a timeslot of a carrier frequency for radio provisioning a respectively assigned mobile station; and
   selecting the timeslot from the commonly assigned radio transmission resources taking account of an interference situation in the timeslot.

2. The method according to claim 1, wherein adjacent base stations employ radio transmission resources from a stock commonly assigned to the base stations for data transmission.

3. The method according to claim 1, further comprising synchronizing by at least one of the base station and mobile station by adjusting carrier frequencies and timeslot-transmitting instants.

4. The method according to one claim 3, further comprising reducing co-channel interference on at least one of the base station and mobile station by interference suppression methods.

5. The method according to claim 4, further comprising assigning radio transmission resources on the base station side to minimize co-channel interference in adjacent radio cells.

6. The method according to claim 5, wherein an orthogonal frequency division multiplexing radio transmission method is employed.

7. The method according to claim 6 wherein one of a time-division duplex and frequency-division duplex radio transmission method is employed.

8. The method according to claim 6, further comprising determining one of a time deviation through correlating and a frequency deviation by ascertaining a phase rotation of consecutive symbols following a transformation into the frequency range.

9. The method according to claim 8, wherein said synchronizing of the base station and the mobile station of the radio communication system requires no additional signaling using a higher protocol layer between the base station and assigned mobile station.

10. A base station, in a radio cell of a radio communication system divided into radio cells transmitting data by multiple access methods, for radio provisioning mobile stations assigned to the radio cell, comprising:
    a receiver receiving mobile station signals of the radio cell and adjacent radio cells and utilizing time slots of jointly assigned carrier frequencies of an adjacent base station as radio transmission resources wherein the base station and the adjacent base station simultaneously and jointly employ a time slot of a carrier frequency for radio provisioning of a mobile station, and selecting the time slot from the commonly assigned radio transmission resources taking account of an interference situation in the time slot; and
    a processor determining from the mobile station signals, a synchronizing value for at least one of time synchronizing and frequency synchronizing to which said base station synchronizes itself.

11. A radio communication system divided into radio cells transmitting data by multiple access methods, each radio cell having a base station for radio provisioning mobile stations assigned to the radio cell, comprising:
    a time slot means, assigned to a corresponding radio cell, assigning time slots of jointly assigned carrier frequencies of an adjacent base station as radio transmission resources wherein the base station and the adjacent base station simultaneously and jointly employ a time slot of a carrier frequency for radio provisioning of a mobile station, and selecting the time slot from the commonly assigned radio transmission resources taking account of an interference situation in the time slot; and
    at least one base station, each assigned to a corresponding radio cell, receiving mobile station signals of the corresponding radio cell and adjacent radio cells and determining, from the mobile station signals, a synchronizing value for at least one of time synchronizing and frequency synchronizing of the at least one base station.

12. A method for synchronizing a radio communication system divided into radio cells transmitting data using a multiple access method, comprising:
    assigning each radio cell a respective base station for radio coverage of a plurality of mobile stations assigned to the radio cell;
    utilizing time slots of jointly assigned carrier frequencies of adjacent base stations as radio transmission resources wherein two adjacent base stations simultaneously and jointly use a time slot of a carrier frequency for radio coverage of a mobile station;
    receiving at the base station, signals from the adjacent base stations, and signals from the plurality of mobile stations in adjacent radio cells; and
    determining from the signals from the adjacent base stations and the signals from the plurality of mobile stations in adjacent radio cells, a synchronization value for at least one of a time synchronization and a frequency synchronization.

* * * * *